(12) United States Patent
LaLonde et al.

(10) Patent No.: US 9,607,412 B2
(45) Date of Patent: Mar. 28, 2017

(54) METHOD FOR RAPID DETERMINATION OF LOWEST COST WAVELENGTH ROUTES THROUGH A PHOTONIC NETWORK BASED ON PRE-VALIDATED PATHS

(75) Inventors: Frederick LaLonde, Ottawa (CA); Francois Blouin, Nepean (CA); Mark Draper, Ottawa (CA)

(73) Assignee: Ciena Corporation, Hanover, MD (US)

( * ) Notice: Subject to any disclaimer, the term of this patent is extended or adjusted under 35 U.S.C. 154(b) by 162 days.

(21) Appl. No.: 12/699,927

(22) Filed: Feb. 4, 2010

(65) Prior Publication Data
US 2011/0188865 A1 Aug. 4, 2011

(51) Int. Cl.
*H04J 14/00* (2006.01)
*G06T 11/20* (2006.01)
*H04B 10/00* (2013.01)

(52) U.S. Cl.
CPC ............. *G06T 11/20* (2013.01); *H04B 10/00* (2013.01)

(58) Field of Classification Search
USPC .......................................................... 398/57
See application file for complete search history.

(56) References Cited

U.S. PATENT DOCUMENTS

| | | | | |
|---|---|---|---|---|
| 7,020,394 B2* | 3/2006 | Zhang | ................. | H04J 14/0227 398/25 |
| 7,236,699 B2* | 6/2007 | Beshai | ............... | H04Q 11/0005 398/45 |
| 7,283,741 B2* | 10/2007 | Sadananda | ............. | H04L 45/02 398/5 |
| 7,298,704 B2* | 11/2007 | Kodialam | ............... | H04L 45/62 370/238 |
| 7,340,169 B2* | 3/2008 | Ovadia | ............... | H04L 12/5695 398/45 |
| 7,369,767 B2* | 5/2008 | Laalaoua | ............ | H04J 14/0227 370/400 |
| 7,415,208 B1* | 8/2008 | Haggans | ............. | H04J 14/0227 398/49 |
| 7,477,843 B1* | 1/2009 | Peeters | ............. | H04Q 11/0062 398/49 |

(Continued)

OTHER PUBLICATIONS

Chlamtac et al; lightpath (wavelength) routing in l;arge WDM networks; Jun. 1996; IEEE journal on selected areas in communications vol. 14 No. 5; pp. 909-913.*

(Continued)

*Primary Examiner* — Ken N Vanderpuye
*Assistant Examiner* — Amritbir Sandhu
(74) *Attorney, Agent, or Firm* — Clements Bernard Walker PLLC; Christopher L. Bernard; Lawrence A. Baratta, Jr.

(57) ABSTRACT

A method of setting up an end-to end connection between two end-points in an optical network. A plurality of validated paths in the network are defined. Each validated path extends between a respective pair of wavelength termination points and has requisite physical resources to carry signal traffic between its pair of wavelength termination points. A graph of the network is generated. An edge of the graph corresponds with a respective validated path, and a vertex of the of the graph corresponds with at least one wavelength termination point. The graph is analyzed to compute an end-to-end path between two vertices respectively corresponding with end-points of the end-to-end connection, and the end-to-end connection set up using the computed path.

11 Claims, 4 Drawing Sheets

(56) References Cited

U.S. PATENT DOCUMENTS

| | | | |
|---|---|---|---|
| 7,676,155 B2* | 3/2010 | Cho | H04J 14/0227 398/57 |
| 7,689,120 B2* | 3/2010 | Hoang | H04L 45/02 398/57 |
| 7,783,194 B2* | 8/2010 | Hyndman | H04L 41/12 370/248 |
| 7,787,769 B1* | 8/2010 | Slezak | H04J 14/0227 398/57 |
| 7,813,948 B2* | 10/2010 | Ratzloff | 705/7.22 |
| 7,941,778 B2* | 5/2011 | Ou | G06F 17/5077 398/57 |
| 8,050,560 B2* | 11/2011 | Park et al. | 398/57 |
| 8,059,960 B2* | 11/2011 | Lee | H04Q 11/0062 370/351 |
| 8,452,176 B2* | 5/2013 | Doverspike | H04J 14/0257 370/238 |
| 8,565,598 B2* | 10/2013 | Gerstel | H04L 45/124 398/57 |
| 8,634,714 B2* | 1/2014 | Yim | H04J 14/0267 398/57 |
| 8,902,909 B2* | 12/2014 | Wang | H04Q 11/0062 370/352 |
| 8,909,042 B2* | 12/2014 | Oki | H04B 10/299 398/57 |
| 8,977,123 B2* | 3/2015 | Patel | H04Q 11/0005 398/49 |
| 2002/0109879 A1* | 8/2002 | Wing So | 359/118 |
| 2003/0099010 A1* | 5/2003 | Liu | H04B 10/00 398/5 |
| 2003/0161633 A1* | 8/2003 | Oki | H04Q 11/0062 398/57 |
| 2004/0141743 A1* | 7/2004 | Okada | H04Q 11/0005 398/57 |
| 2004/0208556 A1* | 10/2004 | Joly | H04J 14/0227 398/57 |
| 2004/0218922 A1* | 11/2004 | Giles | H04Q 11/0066 398/57 |
| 2005/0134603 A1* | 6/2005 | Iourcha | G06T 11/20 345/611 |
| 2007/0201871 A1* | 8/2007 | Peddanarappagari | H04B 10/077 398/57 |
| 2007/0212067 A1* | 9/2007 | Miyazaki | H04J 14/0227 398/57 |
| 2007/0212068 A1* | 9/2007 | Miyazaki | H04J 14/0227 398/57 |
| 2008/0002975 A1* | 1/2008 | Vukovic | H04J 14/0227 398/57 |
| 2008/0031623 A1* | 2/2008 | Bardalai | H04J 14/0227 398/57 |
| 2008/0036769 A1* | 2/2008 | Coutts | G06T 11/20 345/441 |
| 2008/0056717 A1* | 3/2008 | Niven-Jenkins | H04J 14/0227 398/57 |
| 2009/0010647 A1* | 1/2009 | Jenkins | H04L 45/04 398/57 |
| 2011/0188865 A1* | 8/2011 | LaLonde | H04B 10/00 398/156 |
| 2012/0321308 A1* | 12/2012 | Lee | H04L 45/00 398/49 |
| 2013/0216624 A1* | 8/2013 | Lee | A61K 9/1676 424/499 |
| 2016/0057010 A1* | 2/2016 | Lopez Morillo | H04L 41/0816 398/49 |
| 2016/0057519 A1* | 2/2016 | Hand | H04Q 11/0066 398/49 |

OTHER PUBLICATIONS

Chen etal; A multipath routing mechanism in optical networks with extremely high bandwidth request; IEEE communicatiosn; 2009.*

* cited by examiner

METHOD FOR RAPID DETERMINATION OF LOWEST COST WAVELENGTH ROUTES THROUGH A PHOTONIC NETWORK BASED ON PRE-VALIDATED PATHS

CROSS-REFERENCE TO RELATED APPLICATIONS

This application is the first application filed for the present invention.

MICROFICHE APPENDIX

Not Applicable.

TECHNICAL FIELD

The present invention relates generally to optical communication systems, and in particular to methods for rapid determination of lowest cost wavelength routes through a photonic network.

BACKGROUND

Techniques for determining a path between two nodes in a network are well known in the art. Typically, the network topography is modeled as a graph, in which each network node is represented as a vertex, and each link of the network is represented as an edge. Network parameters, such as the available capacity of any given link, can then be represented by assigning corresponding attributes to each edge of the graph. With this arrangement, the graph can be analysed using any of a variety of well-known algorithms (such as Djykstra, Shortest Path First, etc.) to find one or more paths through the network between any two nodes.

For example, FIG. 1a shows a representative layer 2 mesh network 2 in which a set of nodes 4a-4h are interconnected via links 6. As shown in FIG. 1b, the topology of the network 2 can be modelled as a graph 8, in which each node 4 of the network 2 corresponds with a vertex 10 of the graph, and each link 6 of the network 2 corresponds with an edge 12 of the graph. Least cost end-to-end paths can then be computed between any two nodes 4 of the network 2, by analysing the graph 8 using known algorithms, such as Dijkstra etc. In the example of FIGS. 1a and 1b, two least cost end-to-end paths 14 have been computed between vertices A and H, 10a and 10h. Once computed, these paths 14 can be used to set up corresponding end-to end connections (not shown) through the network 2.

The above-described methods have been well developed for Layer-2 mesh networks such as the Internet, Ethernet mesh networks etc. It would be desirable to apply these same techniques to physical-layer networks, such as photonic mesh networks. However, at the physical layer, conventional path computations techniques do not always work. In particular, in a layer-2 network, finding a path through the network between two nodes automatically implies that packets can be routed between the two nodes. In a physical layer network, this does not always hold true, because physical limitations within the network may prevent successful data transmission even where there appears to be sufficient capacity in each link.

For example, consider a scenario in which it is desired to set up an end to end connection ABEH between node A and node H and traversing nodes B and E (FIG. 1a), where each of the links A-B, B-E, and E-H has sufficient available capacity to support the connection. According to conventional path computation techniques, confirmation that there is sufficient capacity on each link individually implies that the end-to end connection can be set up by setting the appropriate routing state in each involved node. However, if the available capacity in each of links A-B and B-E is located on different wavelengths, for example, then the viability of the connection will depend on the availability of wavelength conversion capacity in node B. Furthermore, if the connection (or a part of the path) is not optically viable (e.g. due to attenuation or dispersion etc.), then the viability of the connection will also depend on the availability of signal regeneration capacity in at least one of nodes B and E. Conventional path computation techniques do not adequately address these issues.

A still further limitation of conventional path computation techniques is that they typically do not accommodate non-transitive characteristics of a physical network. In particular, in a physical optical network, the fact that a connection ABEH (for example) is valid, does not imply that the reverse connection "HEBA" is valid. Furthermore, if a valid connection can be set up on link AB and another valid connection can be set up on link BE, this does not imply that a valid connection ABE can be set up across both of these links.

Further limitations arise as a result of the physical layout of the optical network. In particular, it is common to locate various optical equipment (such as optical amplifiers, dispersion compensators, etc.) At various locations within the network. Typically, this equipment is co-located with the network nodes, but network operators will commonly not install all types of optical equipment at every node. This means, for example, that some nodes will have an optical dispersion compensator, but others will not. In this situation, it is possible, for a scenario to arise in which connection ABEH is viable, but a shorter (and thus presumably easier to implement) connection ABE is not viable, because the needed dispersion compensation is only located at node H.

In view of the above issues, it is common practice in photonic networks to use a conventional path computation technique to identify one or more candidate paths between two nodes. Each candidate path is then analysed, using a different process, to determine whether or not a viable connection can be set up along that path, given the physical topology and constraints of the network and taking into account any requirements for wavelength conversion, signal regeneration, dispersion compensation, and optical amplification, for example. A limitation of this approach is that path validation can require significant amounts of time to complete, and, if a candidate path is determined to be invalid, this step must be repeated for another candidate path. Consequently, the set-up of connections though a physical-layer photonic network tends to be time consuming and laborious for network managers.

Techniques for computing a path through a photonic network that overcome limitations of the prior art remain highly desirable.

SUMMARY

Accordingly, an aspect of the present invention provides a method of setting up an end-to end connection between two end-points in an optical network. A plurality of validated paths in the network are defined. Each validated path extends between a respective pair of wavelength termination points and has requisite physical resources to carry signal traffic between its pair of wavelength termination points. A graph of the network is generated. An edge of the graph corresponds with a respective validated path, and a vertex of the of the graph corresponds with at least one wavelength termination point. The graph is analysed to compute an end-to-end path between two vertices respectively corresponding with end-points of the end-to-end connection, and the end-to-end connection set up using the computed path.

BRIEF DESCRIPTION OF THE DRAWINGS

Representative embodiments of the invention will now be described by way of example only with reference to the accompanying drawings, in which.

It will be noted that throughout the appended drawings, like features are identified by like reference numerals.

DETAILED DESCRIPTION OF PREFERRED EMBODIMENTS

Figure 1A:
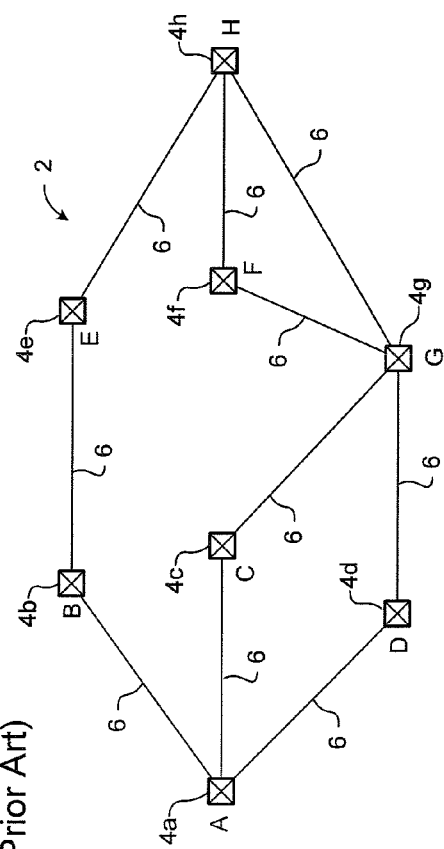
FIGS. 1a and 1b schematically illustrate a mesh network and a graph of that network computed in accordance with known methods.
Figure 1B:
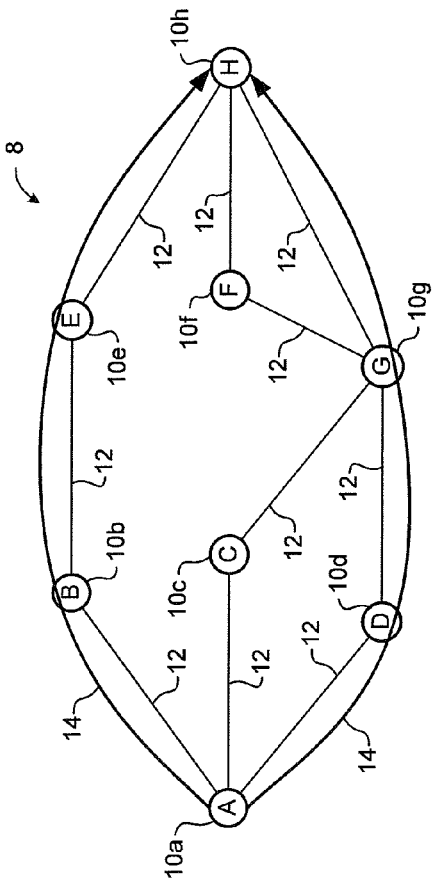
Figure 2A:
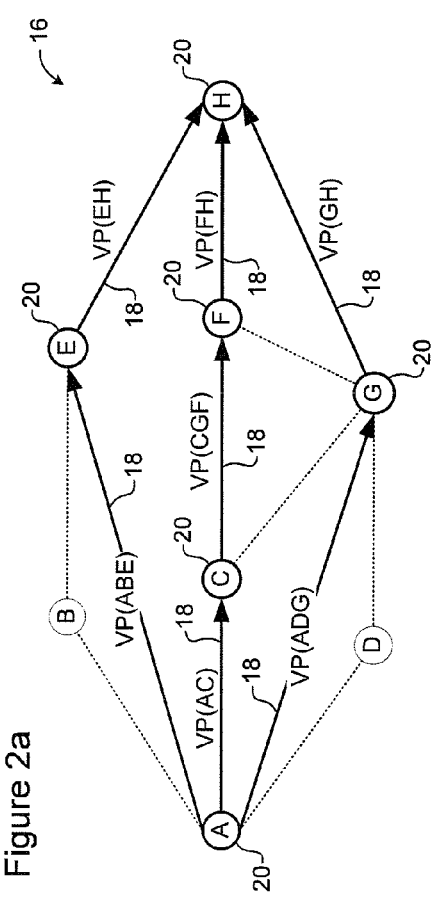
FIGS. 2a and 2b schematically illustrate graphs of a physical layer network computed in accordance with a first embodiment of the present invention.

In very general terms, in accordance with the present invention a graph of the physical layer network is constructed, in which each vertex represents a wavelength termination point, and each edge represents a validated path between a pair of wavelength termination points. For example, FIG. 2a shows a graph 16 of a physical layer mesh network having the same topology as the layer 2 mesh network of FIG. 1. In the graph 16 of FIG. 2a, each edge 18 represents a validated path through the physical layer network between a respective pair of wavelength termination points, which are represented as vertices 20 of the graph 16.

For convenience of description, each edge 18 is labelled with an identifier of the associated validated path (VP), which includes an identification of the involved physical network nodes in parentheses. Thus, edge VP(AC) corresponds with a validated path through the physical layer network between network nodes A and C; edge VP(GH) corresponds with a validated path through the physical layer network between network nodes G and H, etc. Each of these validated paths traverse a single link (which may include one or more spans) of the physical layer network. On the other hand, edge VP(ABE) corresponds with a validated path through the physical layer network between network nodes A and E, with a transparent optical pass-through at node B. In this case, node B is included in the validated path identifier because the validated path traverses this node, and thus node B will need to be configured to pass through the optical signal so as to set up an end-to end connection that follows the validated path. However, node B does not serve as a wavelength termination point of VP(ABE), and thus does not appear as a vertex 20 in the graph 16. Node B, and its physical links to nodes A and E are shown in dashed line in FIG. 2a, primarily to highlight the relationship between the graph 16 and the physical network topology.

Figure 2B:
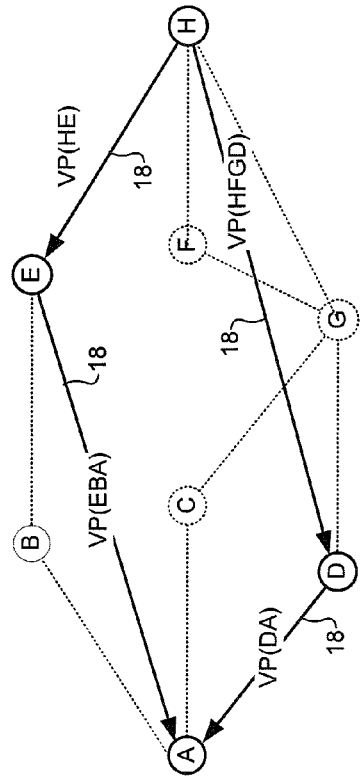

As may be seen in FIG. 2a, each edge 18 has a direction attribute, indicated by an arrow in the figure, which identifies the direction of traffic flow for which the corresponding validated path 18 has been validated. In general, the availability of optical transport capacity over a given physical network path in one direction, does not imply that optical transport capacity is available over that same physical network path in the opposite direction. Accordingly, in order to convey bidirectional traffic between any two physical nodes, respective edges 18 must be defined for each direction. If desired, a respective graph 16 may be computed for each direction, and these graphs may or may not be topologically similar. For example, FIG. 2a shows a graph 16 of validated paths capable of conveying traffic from node A to node H. FIG. 2b shows a possible graph 16 of validated paths for conveying traffic in the opposite direction; from node H to node A. Note that in the graph of FIG. 2b, edge VP(HFGD) corresponds with a validated path through the physical layer network between network nodes H and D, with transparent optical pass-throughs at nodes F and G. However, it will be noted that many conventional traffic engineering protocols require that bi-directional traffic flows between two nodes be reciprocally symmetric, in the sense that respective traffic flows in opposite directions must follow the same path through the network. In the example of FIGS. 2a and 2b, the requirement for reciprocal symmetry means that traffic flowing from node A to node H must follow the same path through the network as traffic flowing from node H to node A. Thus, in the graphs 16 of FIGS. 2a and 2b, the only edges 18 that can be used to construct reciprocally symmetric end-to end paths between nodes A and H are VP(ABE) and VP(EH) for traffic flowing from node A to node H, and VP(HE) and VP(EBA) for traffic flowing from node H to node A. It will be seen that edges VP(ABE) and VP(EBA) are reciprocally symmetric with each other, as are edges VP(EH) and VP(HE). In some embodiments, reciprocal symmetry of end-to-end paths can be forced, by filtering the graph(s) 16 to eliminate any edge 18 for which a corresponding reciprocally symmetric edge does not exist.

In general, a wavelength termination point is a location at which electrical-to-optical (EO) or optical-to-electrical (OE) conversion takes place. In the example of FIGS. 2a-b, the wavelength termination points correspond with physical layer network nodes at which optical wavelength channels are terminated (e.g. either at a transmitter or a receiver).

In general, a validated path (VP) is a path through the network which has been defined and verified as having the requisite physical resources (including, but not limited to, bandwidth, wavelength channel availability and signal reach) to carry optical signal traffic between the involved wavelength termination points. For example, a validated path may correspond with an optical channel link between a transmitter and a receiver (which may be located at respective Add-Drop Multiplexer (ADM) sites, for example) which serve as the wavelength termination points of that validated path. Nodes which optically "pass through" the wavelength channel (such as, for example, an optical switch) without regeneration or wavelength conversion, are transparent to the validated path and thus are not represented as vertices in the graph 16. Thus it will be appreciated that, in general, the topology of the graph 16 will be markedly different from that of the physical network.

In some embodiments, each edge 18 (validated path) includes a predetermined set of attributes, which are assigned as part of path computation and validation, and can be used subsequently to find end-to-end paths through the network. Representative attributes include, but are not limited to: identification of a set of optical fibers arranged in order from the transmitter (Tx) to the receiver (Rx) wavelength termination points; a type of WDM or non-WDM interface for which the path has been validated; a superset of wavelengths for which the path has been validated; Photonic equipment present at each end (e.g. MUX/DEMUX type); and a cost associated with the validated path (or information to derive a cost).

If desired, each validated path may be assigned a "cost", which can be used during subsequent computation and set-up of end-to-end paths. For example, the cost of a given validated path may be selected to reflect any one or more of the available bandwidth capacity of the validated path, the length of the validated path, or any other factors, as desired. With this arrangement, conventional path computation algorithm (such as Dijkstra) may be used to compute a "lowest cost" end-to-end path between any two end-nodes.

If desired, conventional path computation and verification techniques can be used to define each validated path, and thereby construct the network graph 16. For example, a set of physical path through the physical network between a given node and a plurality of other nodes in the network may be determined using an automated path computation process (either centralized or distributed, as desired), or alternatively may be manually specified. Each of these physical paths can then be examined using conventional validation methods (which may be any combination of automated and manual procedures) to validate the availability of that path to carry optical signal traffic. Any physical paths that are not available carry optical signal traffic are discarded, and the remaining physical paths used as validated paths. Furthermore, validated paths can be updated in response to changes in physical link capacity, resource availability, fiber characterization, or network topology, again in a conventional manner. However, these path computation and validation processes can performed on an on-going basis in response to capacity and/or physical network topology changes, rather than during set-up of an end-to-end connection through the network. Consequently, the time required to compute and verify validated paths does not contribute to the time required to set up end-to end connections through the physical layer network.

The graphs 16 of FIGS. 2a and 2b model only those validated paths which are suitable for conveying traffic between nodes A and H, and thus represent only a sub-set of all of the validated paths within the network. In practice, one or more graphs 16 would be generated so as to model all validated paths in the network, and so construct a representation of the network topology. Conventional path computation and traffic engineering processes can use this representation of the network topology to implement a variety of network control and management functionality including, but not limited to: computing end-to end paths between any two nodes in the network; defining traffic forwarding rules; and implementing protection switching and fault recovery functionality, as desired. Because end-to-end paths through the network are constructed as a concatenation of validated paths, it is not necessary to perform further verification procedures prior to set-up of the corresponding end-to-end connections in the physical network. Consequently, the mean time required to set up end-to-end connections through the physical layer network is significantly lower than in conventional methods.

As note above, each vertex 20 of the graph 16 represents a wavelength termination point of the physical network. In the embodiments described above with reference to FIGS. 2a-b, each wavelength termination point corresponds with a physical network node.

As is known in the art, in an end-to-end connection through an optical network, electrical signal processing operations, such as signal regeneration and wavelength conversion, may be necessary. These processes add to the cost of an end-to-end connection. In some cases, it may be desirable to incorporate the cost and availability of these services into the path computation process. In some embodiments, this is accomplished by expanding the graph 16 to include intra-node edges 22 representing electrical signal processing resources, as may be seen in FIG. 3.

Figure 3:
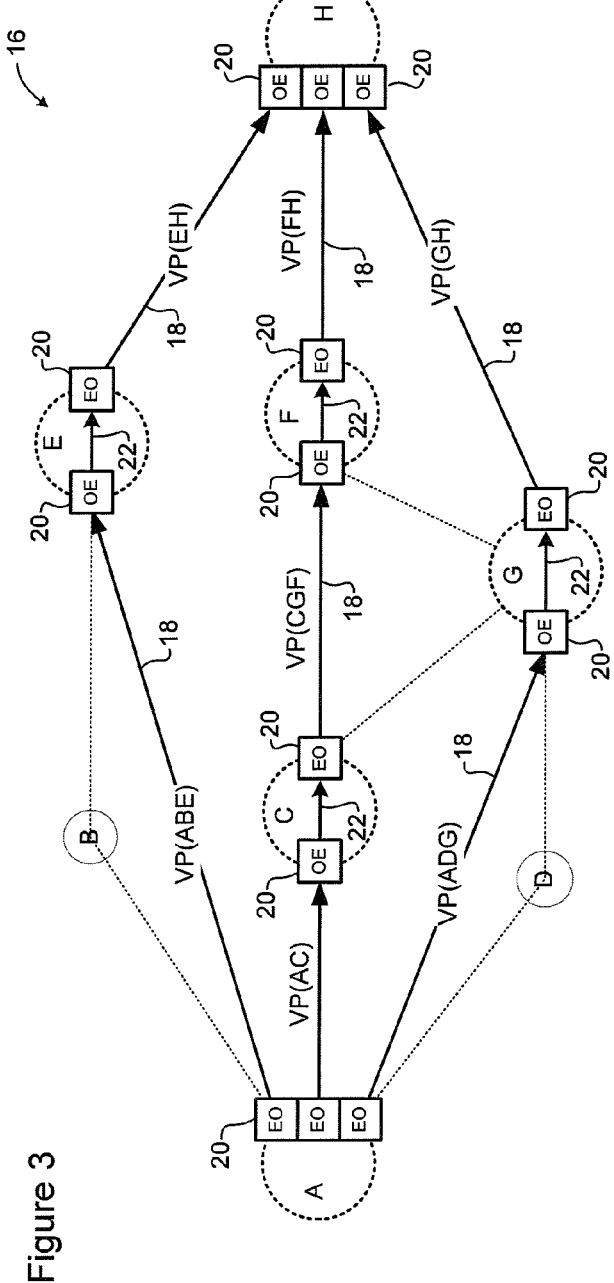
FIG. 3 schematically illustrate a graph of a physical layer network computed in accordance with a second embodiment of the present invention.

In the embodiment of FIG. 3, each vertex 20 corresponds with an input OE port (receiver) or an output EO port (transmitter) of a node, which contrasts with the embodiment of FIGS. 2a-b, in which each vertex 20 corresponds with a respective node, taken as a whole. Electronic services provided by the node (such as routing through a switching fabric, signal regeneration, and wavelength conversion) can thus be represented by an intra-node edge 22 that extends between the receiver and transmitter sides of the node, as may be seen in FIG. 3. In order to avoid unnecessary proliferation of intra-node edges (for example to model all possible connections between each receiver port and each transmitter port), a common intra-node edge can be used. In this case, the common intra-node edge differs from extra-node edges 20 in that it models the entire available capacity of the node, and is not tied to a specific pair of vertices (transmitter/receiver ports). Instead, the intra-node edge definition can be designed such that it originates at a known set of source vertices (receiver ports), and extends to a known set of destination vertices (transmitter ports). With this definition, conventional path computation methods can compute an end-to-end path that traverses the intra-node edge between any source vertex and any destination vertex.

With this arrangement, validated paths can be computed and verified as described above with reference to FIGS. 2a-b, and used to construct a graph 16 in which each vertex 20 corresponds with a respective transmitter/receiver port of a node. Intra-node edges 22 can then be added to the graph to reflect the availability and cost of electronic signal processing resources within each node. The resulting graph 16 (FIG. 3) can then be used to compute end-to-end paths through the network, using conventional path computation techniques. However, in this case, the computation of end-to-end paths will automatically also take into account the availability and cost of electronic signal processing resources which must be implemented in each node in order to successfully concatenate validated paths through the network.

Figure 4A:
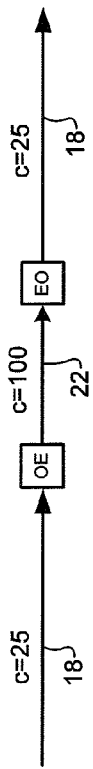
FIGS. 4a and 4b schematically illustrate attribution of costs of electrical network services to validated paths terminated at a common node.
Figure 4B:
Figure 5C:
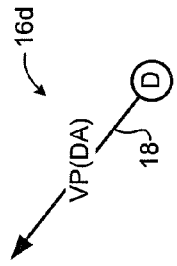
FIG. 5a-5g schematically illustrates respective node-centric graphs usable for distributed path computation.
Figure 5B:
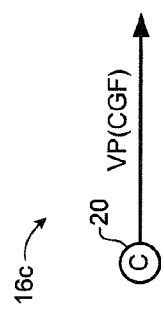
Figure 5A:
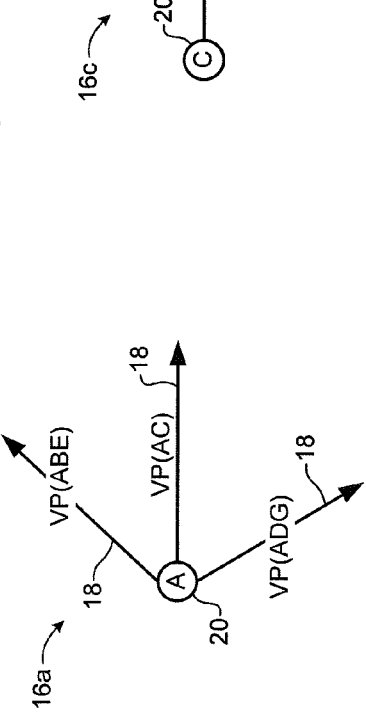
Figure 5E:
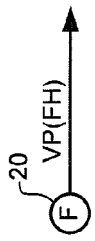
Figure 5D:
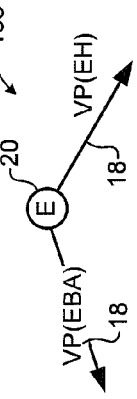
Figure 5G:
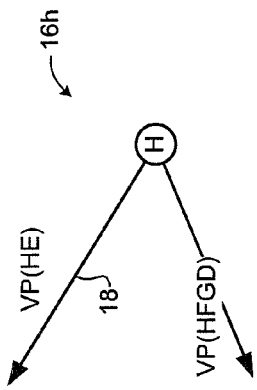
Figure 5F:
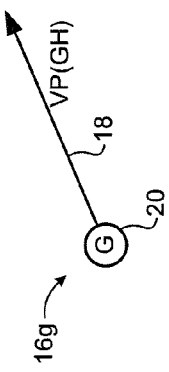

A limitation of the method described above with reference to FIG. 3, is that including intra-node edges into the graph can undesirably increase the size and complexity of the graph. In some embodiments, the use of intra-node edges can be avoided by attributing the costs of EO and OE conversion at each end of a validated path to the cost of that path. For example, FIG. 4a shows pair of VP edges 18, each of which has a cost of 25, interconnected via an intra-node edge 22 having a cost of 100. The intra-node edge 22 can be eliminated by attributing its cost to each of the VP edges 18, to yield the arrangement of FIG. 4b, in which the two VP edges 18 each have a cost of 25+50, and are interconnected via a (zero-cost) vertex 20. In a directly analogous manner, costs of other electronic services provided by a given node can be attributed to each validated path which terminates at that node, if desired. These costs can be updated as needed to reflect current availability of resources of the node. With this arrangement, computation of end-to-end paths will automatically also take into account the availability and cost of electronic signal processing resources which must be implemented in each node, without the need to include intra-node edges within the network graph.

As may be appreciated, computation of end-to-end paths can be computed in either a centralized or a distributed manner. In a centralized path computation model, a network graph of validated paths is computed by a centralized process, for example using a network management server. When an end-to-end connection is required, the network management server performs the necessary path computations to identify the lowest-cost concatenation of validated paths needed to construct the end-to-end connection, and downloads the appropriate routing and resource allocation commands to the involved network nodes. In some embodiments, a network control plane may be instantiated to facilitate this operation.

In a distributed path computation model, each edge node of the network is capable of computing the lowest-cost concatenation of validated paths needed to construct an end-to-end connection from itself to every other node in the network. In some cases, each edge node may compute and maintain its own network graph of validated paths. In other cases, each edge node may compute end-to-end paths using information obtained from a centrally maintained network graph.

In an alternative distributed path computation model, edge nodes are capable of computing the lowest-cost concatenation of validated paths needed to construct an end-to-end connection from itself to a set of nodes within a predetermined portion (or area) of the physical network. In this case, each edge node may compute and maintain a network graph of validated paths covering only its local area. Preferably, at least one of the nodes within each local area is designated as a "gateway" node, through which network nodes external to that area can be reached. In some embodiments, an edge node may maintain a listing of each gateway node within its area, and, for each gateway node, a respective listing of all known external nodes (or addresses) that can be reached via validated paths extending from that gateway. In order to compute an end-to-end connection to a desired external node, the edge node first computes a least-cost concatenation of validated paths to a gateway node through which the desired external node can be reached; and then sends a connection request to that gateway. In response to the connection request, the gateway node computes a least-cost concatenation of validated paths to the external node. Upon successful completion of this operation, an end-to end connection between the edge node and the desired external node can be set up. In cases where each node learns and maintains a listing of network addresses that can be reached through each validated paths within its graph, such listing can be the form of either an exhaustive list or a digest, as desired.

In a further alternative distributed path computation model, every node in the network may compute and maintains a graph of validated paths rooted at itself and extending to every other node that can be reached in a single hop (i.e., without re-generation or wavelength conversion). Thus, for example, the network graphs of FIGS. 2a and 2b can be replaced by the set of respective node-centric graphs shown in FIG. 5. If desired, each node may also construct and maintain a listing of network addresses that can be reached through each of the other nodes (or validated paths) within its graph. With this arrangement, distributed address learning and path computation methods known, for example, from Ethernet-based Virtual Private LAN Service (VPLS), and Generalized Multiprotocol Label Switching (GMPLS) can be readily adapted for use to compute a concatenation of validated paths between any two nodes in the network. Such adaptation is considered to be well within the purview of persons or ordinary skill in the art. In some cases, a control plane (analogous to the conventional GMPLS control plane) may be instantiated to handle out-of-band signalling needed to support address leaning and path computation signalling. Here again, in cases where each node learns and maintains a listing of network addresses that can be reached through each validated paths within its graph, such listing can be the form of either an exhaustive list or a digest, as desired.

In the above description, the computation and use of validated paths has been described for the case of finding a lowest cost end-to-end route through a physical network. An assumption underlying this description is that the physical network is pre-existing, and it is desired to set up a connection across the network given the known deployment of equipment and resources of the network. However, validated paths can be used in other ways.

For example, it may be desirable to find an optimum (or lowest cost) configuration of network processes, such as regeneration and wavelength conversion, along an explicitly defined route within a network. In this case, multiple candidate configurations can be designed, and for each configuration validated paths computed to generate a respective graph. These graphs can then be compared to identify each candidate configuration for which a viable end-to-end connection can be set up, and then find the lowest cost viable configuration.

In another example, a network operator planning to deploy a new network, or upgrade an existing network, may wish to determine the optimum locations at which to locate network resources such as regeneration, dispersion compensation, wavelength conversion etc. This can be accomplished by selecting a candidate network plan, specifying proposed locations for network services. A graph of the candidate network plan can then be generated by computing validated paths in the manner described above. Repeating this process for a desired number of different candidate network plans yields a corresponding set of graphs, which can then be analysed to identify the best network plan, from among those tested.

As may be appreciated, various criteria may be used to identify the 'best" network plan. Representative criteria include, but are not limited to: the number of hops (concatenated validated paths) needed to connect any two nodes; the total cost of a given set of connections through the candidate network; the probability that an attempt to set up a connection between any two nodes of the candidate network fails.

In some embodiments, this process can be (partially or fully) automated in a network planning system, which may, for example, be implemented as software for execution on a general purpose computer.

Although the invention has been described with reference to certain specific embodiments, various modifications thereof will be apparent to those skilled in the art without departing from the spirit and scope of the invention as outlined in the claims appended hereto.

We claim:

1. A method of configuring an optical network, the method comprising:
designing a set of two or more different candidate configurations of network resources in at least a portion of the network;
for each candidate configuration, a first network node computing a plurality of validated paths extending between respective pairs of wavelength termination points and having requisite physical resources to carry optical signal traffic between its pair of wavelength termination points, and generating a respective graph of the candidate configuration, wherein an edge of the graph corresponds with a respective validated path and has a direction attribute indicating a direction of traffic flow and a vertex of the graph corresponds with at least one wavelength termination point, wherein the requisite physical resources include at least bandwidth, wavelength channel availability and signal reach;

a second network node analyzing each graph to identify a best one of the candidate configurations based on one or more criteria comprising at least reciprocal symmetry where respective traffic flows in opposite directions must follow the same path through the optical network; and the second network node provisioning resources of the optical network in accordance with the identified best candidate configuration.

2. The method as claimed in claim 1, wherein the set of candidate configurations comprise respective different configurations of network resources along an explicitly defined route in an existing optical network.

3. The method as claimed in claim 1, wherein the set of candidate configurations comprise respective different candidate network plans defining locations of network services in a proposed optical network.

4. The method as claimed in claim 1, wherein the set of candidate network configurations comprises an existing configuration of network resources and at least one alternative configuration of network resources.

5. A general purpose computer executing software for performing the method of claim 1.

6. A non-transitory storage medium comprising machine readable software instructions for execution on a general purpose computer, the software instructions controlling the general purpose computer to perform the method of claim 1.

7. The method as claimed in claim 1, wherein each graph has costs attributed for Electrical-to-Optical (EO) conversion and Optical-to-Electrical (OE) conversion.

8. The method as claimed in claim 1, wherein each graph has a corresponding graph for the candidate configuration to support bidirectional traffic between any two physical nodes in the optical network.

9. The method as claimed in claim 8, wherein each graph and its corresponding graph for the candidate configuration to support bidirectional traffic has reciprocal symmetry forced therein by elimination of any edge for which a corresponding reciprocally symmetric edge does not exist.

10. The method as claimed in claim 1, wherein the one or more criteria comprise regeneration and wavelength conversion.

11. The method as claimed in claim 1, wherein the one or more criteria comprise a number of hops.

* * * * *